United States Patent [19]

Gallagher, Jr.

[11] Patent Number: 5,454,888

[45] Date of Patent: * Oct. 3, 1995

[54] WARM FORMING HIGH-STRENGTH STEEL STRUCTURAL MEMBERS

[75] Inventor: Hugh M. Gallagher, Jr., Cincinnati, Ohio

[73] Assignee: Consolidated Metal Products, Inc., Cincinnati, Ohio

[ * ] Notice: NOTE-DISCLAIMER The portion of the term of this patent subsequent to Mar. 10, 2009 has been disclaimed.

[21] Appl. No.: 275,841

[22] Filed: Jul. 15, 1994

Related U.S. Application Data

[63] Continuation-in-part of Ser. No. 91,640, Jul. 14, 1993, abandoned, which is a continuation-in-part of Ser. No. 827,740, Jan. 29, 1992, abandoned, which is a continuation-in-part of Ser. No. 602,675, Oct. 24, 1990, Pat. No. 5,094,698.

[51] Int. Cl.$^6$ ..................................................... C21D 8/00
[52] U.S. Cl. .............................. 148/648; 72/364; 72/700
[58] Field of Search ....................... 72/364, 700; 148/584

[56] References Cited

U.S. PATENT DOCUMENTS

| | | |
|---|---|---|
| 1,862,281 | 6/1932 | Schaefer . |
| 2,767,836 | 10/1956 | Nachtman et al. . |
| 2,767,837 | 10/1956 | Nachtman et al. . |
| 2,880,855 | 4/1959 | Nachtman . |
| 2,953,794 | 9/1960 | Klooz . |
| 3,001,897 | 9/1961 | Nachtman . |
| 3,066,408 | 12/1962 | Fader . |
| 3,076,361 | 2/1963 | Epstein et al. . |
| 3,557,587 | 1/1971 | Cardillo . |
| 3,573,999 | 4/1971 | Gokyu . |
| 3,720,087 | 3/1973 | Gottschlich . |
| 3,877,281 | 4/1975 | Shimizu et al. . |
| 3,904,445 | 9/1975 | Gallagher, Jr. . |
| 3,908,431 | 9/1975 | Jones et al. . |
| 3,959,999 | 6/1976 | Filatov et al. . |
| 4,289,548 | 9/1981 | Bucher et al. . |
| 4,312,210 | 1/1982 | Nishizawa et al. . |
| 4,317,355 | 3/1982 | Hatsuno et al. . |
| 4,365,824 | 12/1982 | Ohno et al. . |
| 4,608,851 | 9/1986 | Khare . |
| 4,805,437 | 2/1989 | Heil, Jr. et al. . |

FOREIGN PATENT DOCUMENTS

| | | |
|---|---|---|
| 93218A1 | 11/1983 | European Pat. Off. . |
| 2218399 | 2/1974 | France . |
| 51-144328A | 12/1976 | Japan . |
| 58027958 | 2/1983 | Japan . |

OTHER PUBLICATIONS

*High–Tensile Bolts* by Kobe Steel, from Chemical Abstracts No. 101411b, vol. 95 (1981.09) No. 12, Sep. 21, 1981, p. 219.

*Warm Working of Steel* by Isao Gokyu and Teruo Kishi, from Japanese Inst. of Metal vol. 9, Supp., 1968.

*Strengthening of Warm–Rolled Low–Carbon Steels* by M. L. Bernshtein and N. V. Filatova, from 2354 Metal Science and Heat Treatment 26, Feb. 1, 1984, pp. 128–131.

*Materials Science in Engineering*, Second Edition, by Carl A. Keyser, 1974, pp. 236–237.

*Warm Extrusion of Free–Cutting Steels* by E. Nehl, from CA102(22): 888 63K American Chem. Society, 1984.

*Primary Examiner*—Deborah Yee
*Attorney, Agent, or Firm*—Wood, Herron & Evans

[57] ABSTRACT

High strength steel structural members and method of making are disclosed by providing a blank of high-strength steel material having a tensile strength of at least about 120,000 psi and a yield strength of at least about 90,000 psi and warm forming the blank to provide the member of desired geometric configuration while substantially maintaining or increasing the strength properties of the blank.

11 Claims, No Drawings

WARM FORMING HIGH-STRENGTH STEEL STRUCTURAL MEMBERS

RELATED APPLICATIONS

This is a continuation-in-part of application Ser. No. 08/091,640, filed Jul. 14, 1993, which in turn was a continuation-in-part of application Ser. No. 07/827,740, filed Jan. 29, 1992, both now abandoned, which in turn was a continuation-in-part of application Ser. No. 07/602,675, filed Oct. 24, 1990, now U.S. Pat. No. 5,094,698, issued on Mar. 10, 1992, which was the parent of application Ser. No. 07/848,646, filed Mar. 9, 1992, now U.S. Pat. No. 5,236,520, issued on Aug. 17, 1993.

FIELD OF THE INVENTION

The present invention relates to a method of making high-strength steel structural members, and more particularly it relates to a method in which a blank of high-strength steel is warm formed into a structural member having a desired geometric cross-sectional configuration while maintaining the high-strength properties of the steel blank.

BACKGROUND OF THE INVENTION

High strength steel parts and structural members have heretofore been formed using cold forging or hot forging techniques which are well known in the art. In hot forging or rolling of steel, the material is initially heated to about 2000° F. and higher. At these hot forming temperatures, substantial scale and decarburization of the steel may occur. For many applications the scale and decarburized surfaces must be removed to obtain the finished member or part, known hot forming techniques result in the waste of a certain amount of material; furthermore, such techniques are costly due to increased processing steps required to remove the scale and the higher energy consumption because of the high temperatures.

On the other hand, there are drawbacks to cold forming parts and structural members as well. Since the member or part is formed at or about room temperature, the reshaping or forming steps require substantially higher forces. This frequently necessitates a series of cold forming steps in which the material is formed into the desired shape sequentially. This increases die wear and noise associated with such processes. Furthermore, if the material is worked to a substantial degree over a series of forming stages, the strength of the member or part is increased and it must therefore be annealed between successive cold forming operations to relieve internal stress, which adds to the time and cost of such processes.

To avoid the above drawbacks, warm forging may be utilized to form structural members and parts from materials at an intermediate temperature which is high enough to reduce the strength of the material and thereby facilitate forming, and yet is below the hot forging temperature at which scaling and decarburization occurs. One such warm forming method is disclosed in U.S. Pat. No. 3,557,587. Certain other patents disclose processes which include rolling and extruding steps carried out at "warm" temperatures so as to avoid the drawbacks of decarburization and scaling and/or to impart or improve desired metallurgical and mechanical properties to the steel. See U.S. Pat. Nos. 2,767,836; 2,767,837; 2,880,855; 3,076,361; 3,573,999, and "Warm Working of Steel", Gokyu, et al, translation of the Japanese Institute of Metal, 1968, Volume 9, Supplement, Pages 177–181.

Additionally, there are other known methods for bending or forging steel bars, rods or billets to form a desired product which methods include a warm forming or warm forging step. See U.S. Pat. Nos. 2,953,794; 3,720,087; 3,877,281; 4,312,210; 4,317,355; 4,608,851 and 4,805,437. No representation is made that any of the above cited references fairly represent the prior art or that such references are the most material references.

There has heretofore been lacking a method of making a high-strength steel structural member from a blank of steel possessing desired high-strength properties, which method includes a warm forming step whereby the blank is formed into a desired shape and whereby the mechanical properties of the structural member remain substantially the same or greater than those originally possessed by the blank, and in which the member is produced without additional strengthening processing steps to impart mechanical strength properties thereto.

SUMMARY OF THE INVENTION

The method of the present invention is useful for producing a wide variety of high-strength steel structural members from high-strength steel blanks. In particular, elongated high strength steel members having a uniform cross-sectional configuration over substantially its entire length. For example, structural members having an O, L, C, Z, T, I, W, U, V shapes and other members are susceptible to forming by the warm forging or forming process disclosed herein.

The term "blank" as used herein has its usual meaning, i.e., a piece of metal to be warm formed into a finished member of desired geometric configuration. Blanks include such pieces of metal as wires, rods, bar stock and cut lengths thereof (i.e., a piece of steel long in proportion to its width or thickness). A blank is differentiated from a structural member in that a structural member has at least one flange included in its cross-sectional configuration. The flange is a member which has a thickness less than an overall outer dimension of the cross-sectional configuration and provides increased load bearing capability to the structural member.

The present invention is directed to a method of making high-strength steel structural members from blanks of high-strength steel material having a tensile strength of at least about 120,000 psi and a yield strength of at least about 90,000 psi. In one of its aspects, the present invention provides a method of making high-strength steel structural members from blanks of high-strength steel material by warm forming the blank to provide a structural member having a desired geometric configuration, whereby the mechanical properties of tensile strength and yield strength of the member are substantially the same as or greater than the blank.

The present invention also provides a method of making high-strength steel structural members including warm forming a blank of high-strength steel material whereby the mechanical properties of tensile strength and yield strength of the member are substantially the same as or greater than the blank and wherein the member, with the desired mechanical properties of tensile strength and yield strength, is produced without further strengthening processing steps.

The principles of this invention, its objectives and advantages will be further understood with reference to the following detailed description.

DETAILED DESCRIPTION OF THE INVENTION

A blank is distinguished herein from a structural member in that a structural member is elongate with a uniform cross-sectional configuration which includes at least one flange. The flange is a member which has a thickness less than an overall outer dimension of the cross-sectional configuration (i.e., the width, height, or outer diameter of the structural member). The flange distinguishes the structural member from a blank in that the flange provides increased load bearing capability to the member. In other words, the structural member has more load beating capability with the flange than a member without the flange having the same material composition and properties as the structural member. The load may be axial as in an end-on load, lateral as in a side load or any other type of load applied to the structural member. The flange is integrally formed either continuously or discontinuously with respect to the remainder of the structural member. Examples of discontinuous flanges are the upper and lower portions of an I-shaped beam with respect to the center portion or of either leg of an L-shaped truss with respect to the other leg of the truss. An example of a continuous flange is any cord or portion of the cross-sectional configuration of an O-shaped structural member. Examples of structural members having at least one flange are O, L, C, Z, I, T, U, V, and W shaped members.

In a preferred embodiment, the method of the present invention for making a high-strength steel structural member includes providing a blank of high-strength steel material having a ferrite-pearlite microstructure and a tensile strength of at least about 120,000 psi, and preferably at least about 150,000 psi, and a yield strength of at least about 90,000 psi, and preferably at least about 130,000 psi. In one form, the high-strength steel material utilized as the blank has been hot reduced and cold drawn to provide the blank having the mechanical properties of tensile strength and yield strength stated above.

The high-strength steel material may be exemplified by the following composition, by weight percent:

| carbon | about 0.30 to about 0.65% |
| manganese | about 0.30 to about 2.5% | at least 1 ferrous grain refiner from the group consisting of aluminum, niobium, titanium and vanadium, and mixtures thereof, in an effective amount up to about 0.35%

| iron | balance |

In a more preferred form, the high-strength steel material has the following composition, by weight percent:

| carbon | about 0.40 to about 0.55% |
| manganese | about 0.30 to about 2.5% | at least 1 ferrous grain refiner from the group consisting of aluminum, niobium, titanium and vanadium, and mixtures thereof, in an effective amount up to about 0.20%

| iron | balance |

In a still more preferred form, the high-strength steel material has the following composition, by weight percent:

| carbon | about 0.50 to about 0.55% |
| manganese | about 1.20 to about 1.65% | at least 1 ferrous grain refiner from the group consisting of aluminum, niobium, titanium and vanadium, and mixtures thereof, in an effective amount of about 0.03 to about 0.20%

| iron | balance |

While aluminum, niobium (i.e., columbium), titanium and vanadium act as grain refiners, vanadium is the most preferred of the grain refiners. Furthermore, it should be understood that the compositions listed and claimed herein may include other elements which do not impact upon the practice of this invention.

The blank, having a composition and mechanical properties of tensile strength and yield strength as given above, is thereafter warm formed at a temperature of about 300° to about 1200° F. to provide a structural member having a desired geometric configuration, whereby the mechanical properties of tensile strength and yield strength of the structural member are substantially the same as or greater than the blank. The temperature at which the structural member is formed is related to the chemical composition of the steel material used. The formed structural member, with the mechanical properties of tensile strength and yield strength given, is produced without any further strengthening processing steps subsequent to the warm forming thereof.

The blank of high-strength steel material having a tensile strength of at least about 120,000 psi and a yield strength of at least about 90,000 psi, which is used as the starting piece in the method of the present invention is produced by any suitable method known in the art. One such method is disclosed in U.S. Pat. No. 3,904,445 to the present inventor, and the specification in its entirety is incorporated herein by reference. The '445 patent discloses a processing sequence to produce a high-strength steel bar stock of the type particularly useful for producing threaded fasteners, including U-bolts. In the described process, the bar stock produced has a fine grained structure between about ASTM No. 5-8. In the disclosed process, a steel, having a composition falling within certain disclosed ranges, is subjected to a standard hot reducing operation to within 10%–15% of final gauge. The hot reduced bar stock is then cut or severed into individual lengths for rapid air cooling. Thereafter the individual lengths of hot reduced bar stock are subjected to a cold finishing to final gauge. The final step is a controlled stress relieving step to increase the mechanical strength properties. This stress relieving step comprises heating the lengths of bar stock to between about 500°–850° F. for about 1 hour, but may or may not be necessary. Thus, such bar stock, with and without further stress relieving may be used to form the starting blank material of high-strength steel.

The following example illustrates the practice of the present invention to produce a structural member from high-strength steel bar stock produced in accordance with the method disclosed in U.S. Pat. No. 3,904,445 described above.

EXAMPLE

High-strength 1552 steel I-beam stock had the following composition by weight:

| | |
|---|---|
| Carbon | 0.52% |
| Manganese | 1.43% |
| Phosphorous | 0.009% |
| Sulphur | 0.017% |
| Silicon | 0.22% |
| Vanadium | 0.075% |
| Chromium | 0.05% |
| Molybdenum | 0.01% |
| Iron | balance. |

A center section of the stock had a thickness of 0.177" and each top and bottom flange had a thickness of about 0.16". The overall height of the stock I-beam was 2.64" and the overall width was the same width as each flange, specifically 1.825". A 0.125" radius fillet joined each face of the center section to each flange. The I-beam stock was sectioned into approximately 1 foot lengths. The stock was tested to have a tensile strength of 133,000 psi and a yield strength of 89,000 psi.

The I-beam stock was heated to 800° F. and extruded through a tapered die with 65,000 lbs of force to warm form a finished I-beam structural member. The warm formed I-beam had an overall width of 1.825" and an overall height of 2.64". A center section of the I-beam was 0.16" thick and extended between a pair of spaced 0.155" thick top and bottom flanges. Therefore, the thickness of each flange (0.155") is less than an overall outer dimension of the beam, i.e., the width (1.825") or the height (2.64"). A 0.125" radius fillet was formed onto each face of the juncture between the center section or web and the top and bottom flanges. The warm formed I-beam was tested to have a tensile strength of 141,600 psi and yield strength of 117,300 psi.

The mechanical properties of tensile strength and yield strength of the finished I-beam structural member are greater than that originally possessed by the stock, and therefore, no further strengthening processing steps are required. The finished member also has enough of the desired mechanical property of ductility originally possessed by the bar stock or billet that the need for further processing steps to improve toughness can generally be eliminated. However, for certain uses of the I-beam structural member, a stress relieving step may be necessary.

Compared to prior methods which used a heat treating process (i.e., austenitizing, hardening by quenching and tempering), especially when the heat treatment was used after cold forming to produce the desired high-strength mechanical properties of the member, finished structural members made according to the present invention are more likely to consistently have mechanical properties which fall within a narrower range. Thus, the present invention is more likely to consistently produce higher strength steel structural members within a narrower range.

Thus, in accordance with other features of this invention, the method provides for warm forming a blank into a structural member whereby the mechanical properties of tensile and yield strengths may be substantially the same as or greater than the blank.

The scope of the present invention is not intended to be limited by the examples provided herein, but rather is defined by the appended claims.

What is claimed is:

1. A method of making a high-strength steel structural member comprising the steps of:

providing a blank of high-strength steel material having a tensile strength of at least about 120,000 psi and a yield strength of at least about 90,000 psi; and warm forming the blank to provide a structural member having a uniform cross-sectional configuration, said uniform cross-sectional configuration being different than a configuration of said blank and including at least one flange having a thickness less than an overall perimeter dimension of said cross-sectional configuration, said at least one flange providing increased load bearing capacity to said structural member, whereby the mechanical properties of tensile strength and yield strength of the structural member are substantially the same as or greater than the blank;

wherein the high-strength steel material comprises, by weight percent:

| | |
|---|---|
| carbon | about 0.30 to about 0.65% |
| manganese | about 0.30 to about 2.5% | at least 1 grain refiner from the group consisting of aluminum, niobium, titanium and vanadium, and mixtures thereof, in an effective amount as a grain refiner up to about 0.35%

| | |
|---|---|
| iron | balance | said structural member with said mechanical properties of tensile strength and yield strength produced without further strengthening processing steps.

2. The method of claim 1 wherein the high-strength steel material has previously been hot reduced and cold drawn to provide the blank having a tensile strength of at least about 120,000 psi and a yield strength of at least about 90,000 psi.

3. The method of claim 1 wherein the blank of high-strength steel material has a tensile strength of at least about 150,000 psi and a yield strength of at least about 130,000 psi.

4. The method of claim 1 wherein the high-strength steel material comprises, by weight percent:

| | |
|---|---|
| carbon | about 0.40 to about 0.55% |
| manganese | about 0.30 to about 2.50% | at least 1 grain refiner from the group consisting of aluminum, niobium, titanium and vanadium, and mixtures thereof, in an effective amount as a grain refiner up to about 0.20%

| | |
|---|---|
| iron | balance. |

5. The method of claim 1 wherein the high-strength steel material comprises, by weight percent:

| | |
|---|---|
| carbon | about 0.50 to about 0.55% |
| manganese | about 1.20 to about 1.65% | at least 1 grain refiner from the group consisting of aluminum, niobium, titanium and vanadium, and mixtures thereof, in an effective amount as a grain refiner about 0.03 to about 0.20%

| | |
|---|---|
| iron | balance. |

6. The method of claim 1 wherein said warm forming is carried out at a temperature between about 300 to about 1200° F.

7. The method of claim 1 wherein said uniform cross-sectional configuration is selected from the group consisting of O, L, C, Z, I, T, U, V, and W shapes.

8. A method of making a high-strength steel structural member comprising the steps of:

provided a blank of high-strength steel material having a pearlite microstructure and a tensile strength of at least about 120,000 psi and a yield strength of at least about 90,000 psi;

wherein the high-strength steel material comprises, by weight percent:

| | |
|---|---|
| carbon | about 0.30 to about 0.65% |
| manganese | about 0.30 to about 2.5% | at least 1 grain refiner from the group consisting of aluminum, niobium, titanium and vanadium, and mixtures thereof, in an effective amount as a grain refiner up to about 0.35%

| | |
|---|---|
| iron | balance; and | warm forming the blank to provide a structural member having a uniform cross-sectional configuration, said uniform cross-sectional configuration being different than a configuration of said blank and including at least one flange having a thickness less than an overall perimeter dimension of said cross-sectional configuration, said at least one flange providing increased load bearing capacity to said structural member, whereby the mechanical properties of tensile strength and yield strength of the structural member are substantially the same as or greater than the blank.

9. The method of claim 8 wherein the high-strength steel material comprises, by weight percent:

| | |
|---|---|
| carbon | about 0.50 to about 0.55% |
| manganese | about 1.20 to about 1.65% | at least 1 grain refiner from the group consisting of aluminum, niobium, titanium and vanadium, and mixtures thereof, in an effective amount as a grain refiner about 0.03 to about 0.20%

| | |
|---|---|
| iron | balance. |

10. The method of claim 8 wherein said uniform cross-sectional configuration is selected from the group consisting of O, L, C, Z, I, T, U, V, and W shapes.

11. A method of making a high-strength steel structural member comprising the steps of:

providing a blank of high-strength steel material having a tensile strength of at least about 150,000 psi and a yield strength of at least about 130,000 psi, which material has previously been hot reduced and cold drawn to provide the blank with said strength properties, said high-strength steel material comprising, by weight percent:

| | |
|---|---|
| carbon | about 0.50 to about 0.55% |
| manganese | about 1.20 to about 1.65% | at least 1 grain refiner from the group consisting of aluminum, niobium, titanium and vanadium, and mixtures thereof, in an effective amount as a grain refiner about 0.03 to about 0.20%

| | |
|---|---|
| iron | balance; and | warm forming the blank at a temperature of about 300° to about 1200° F., to provide a structural member having a uniform cross-sectional configuration, said uniform cross-sectional configuration being different than a configuration of said blank and including at least one flange having a thickness less than an overall perimeter dimension of said cross-sectional configuration, said at least one flange providing increased load bearing capacity to said structural member, said uniform cross-sectional configuration being selected from the group consisting of O, L, C, Z, I, T, U, V, and W shapes, whereby the mechanical properties of tensile strength and yield strength of the part are substantially the same as or greater than the blank;

said structural member with said mechanical properties of tensile strength and yield strength produced without further strengthening processing steps.

* * * * *